F. A. FROMMANN.
WHEEL RIM.
APPLICATION FILED JUNE 6, 1913.
1,220,410.
Patented Mar. 27, 1917.
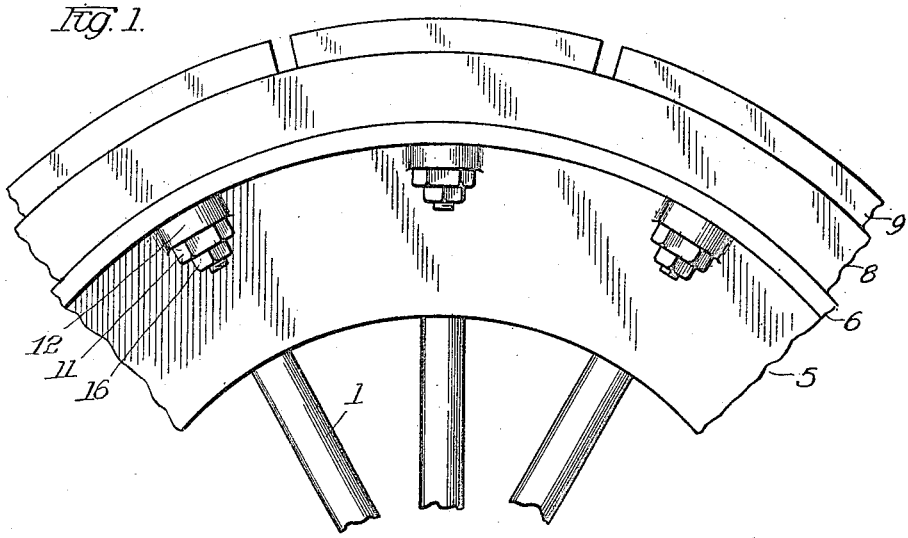
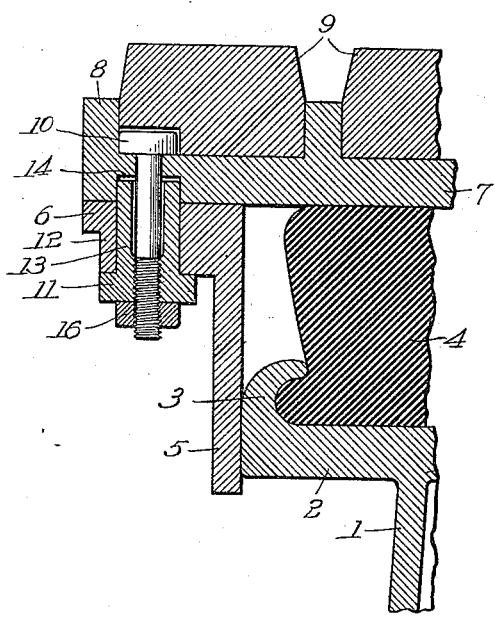
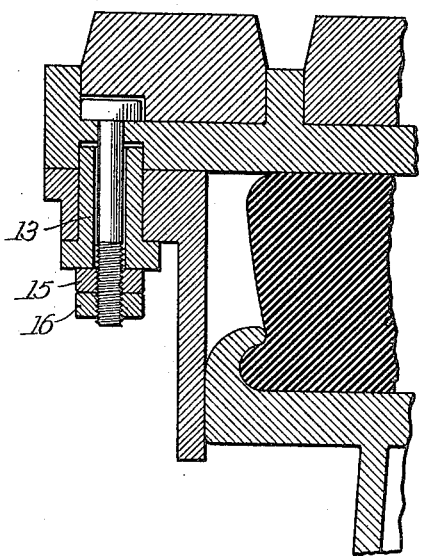
Witnesses:
Robert N Weir
A W Carlson
Inventor
Franklin A. Frommann
by Lotz + Scheible Atty

UNITED STATES PATENT OFFICE.

FRANKLIN A. FROMMANN, OF CHICAGO, ILLINOIS, ASSIGNOR TO OLIVE FROMMANN, OF CHICAGO, ILLINOIS.

WHEEL-RIM.

1,220,410.  Specification of Letters Patent.  Patented Mar. 27, 1917.

Application filed June 6, 1913. Serial No. 772,094.

*To all whom it may concern:*

Be it known that I, FRANKLIN A. FROMMANN, a citizen of the United States, residing at Chicago, in the county of Cook and State of Illinois, have invented certain new and useful Improvements in Wheel-Rims; and I do hereby declare the following to be a full, clear, and exact description of the invention, such as will enable others skilled in the art to which it appertains to make and use the same.

My invention relates to rim construction for vehicles and more particularly to fastenings for members comprising the floatingly carried rim portions of wheels having cushioning elements interposed between the latter and the hub members of the wheel with respect to which the said rims are floatingly mounted. In wheels of this class, it has long been customary to provide the outer or floatingly carried tire portion of the wheel with side flanges having sliding engagement with the lateral edges of an inner rim carried by the hub member of the wheel. In practice, it usually has not been feasible to have the side flanges integral with the rim portion of the wheel, as such a construction makes the cushioning members difficult of access and also makes it difficult to assemble the wheel. Consequently, it has been customary to provide the side flanges with substantially cylindrical webs extending laterally outward from the radially outer edge of each side flange, and to bolt the said webs to the rim of the tire member of the wheel. When such rims are in service, the friction between each side flange and the edge of the inner rim frictionally engaged by the side flange tends to hold the latter against rotating with the rim member to which it is bolted; consequently, the web of each side flange tends to slide upon the rim to which it is secured by the bolt, thereby exerting a strain tending to shear off the shank of the bolt.

The object of my invention is to provide means for increasing the effective resistance of the said bolts against the heretofore described shearing action without increasing the size of the bolts themselves to a point which would make them clumsy in appearance and which would be prohibitive for the space usually available in a compact design of such vehicle rims. I accomplish this object by the construction shown in the accompanying drawings, in which—

Figure —1— is a fragmentary side elevation of the radially outer portions of a wheel equipped with my invention.

Fig. —2— is an enlarged fragmentary radial section through the same wheel.

Fig. —3— is a fragmentary section showing an alternative embodiment of my invention.

In the drawings, the hub member of the wheel has spokes 1 supporting a substantially cylindrical inner rim member equipped at its lateral edges with annular grooved formations 3 adapted to house lateral projections upon the base of a cushioning member 4. The rim 2 has its lateral edges disposed in a plane transverse to the axis of the wheel, so as to afford a sliding bearing along the same plane for the inner edge of an annular side flange 5. The side flange 5 has adjacent to its outer edge a substantially cylindrical web 6 extending laterally outward of the wheel and adapted to engage the inner surface of the cylindrical rim 7 of the tire member floatingly carried by the hub member of the wheel. The tire member of the wheel may be equipped with any suitable form of tire or tread formations, but is shown in the drawings as having a plurality of wooden tread blocks 9 between the same. The tread block adjacent to each of the outer webs 8 is recessed upon its radially inner face so as to provide room for the head 10 of a bolt extending substantially radially of the wheel through the outer rim 7 and the web 6 of the side flange, this bolt having at its inner end a nut for tightening the same. This nut preferably consists of a hexagonal head portion 11 adapted to engage the radially inward face of a boss 12 upon the said web 6 and having a tubular shank 13 extending radially outward from the hexagonal portion 11, the shank 13 being long enough to extend radially outward beyond the juncture of the web 6 and the rim 7 and to enter the recess 14 bored in the latter. The recess 14 has a bore corresponding closely to the outside diameter of the tubular shank 13, so that the said shank will snugly fit the said recess. Consequently, when the bolt is inserted through the rim 7, the web 6 and the boss 12 thereon, and when the bushing 11 is threaded upon the same bolt, this bushing will resist the heretofore described shearing strain by offering a cross-section many times greater than that of the shank of the bolt.

Instead of providing the bushing with an internal thread adapted to engage the thread of the bolt, the bore of the bushing may be unthreaded as in the case of the bushing 13 shown in Fig. —3—, in which case the thread upon the member 11 of the bushing is replaced by a thread upon a nut 15 separate from the said bushing. In either case, I preferably employ a lock nut 16 for preventing the bolt from being loosened by the jarring and vibration to which the wheel is subjected in practice. I also preferably position the radial perforation in the rim 7 so that one edge of the member 10 of the bolt will be close to the adjacent edge of the lateral web 8 of the tire member of the wheel, whereby the head of the bolt will be prevented from rotating by engagement with the said web 8. However, I do not wish to be limited to this or other precise details of the construction herein disclosed, as the same might be modified in many ways without departing from the spirit of the appended claims.

I claim as new and desire to cover by Letters Patent:

1. The improvements herein described comprising a vehicle rim consisting of a cylindrical portion and side flanges and adapted to be floatingly carried upon a wheel, means for securing the side flanges to the rim comprising a plurality of bolts extending radially through alined perforations in the side flanges and rim, bushings on the bolts having threaded engagement with the bolt, and projecting through the side flange and into the rim and a nut on each bolt for engagement with the bushing thereon.

2. In a vehicle rim having a cylindrical rim portion and a pair of side flanges, a cylindrical web integral with each of the said flanges, a plurality of lateral enlargements upon each side flange adjacent to its web, a radial perforation in each of said enlargements, the said perforation extended through the adjacent rim portion and contracted at its end radially outward of the wheel; a bushing slidably fitting but shorter than the uncontracted portion of the said perforation, the bore of the bushing substantially equal to the bore of the said contracted portion of the perforation; and a bolt extending through the said bore of the bushing and the said contracted portion of the perforation; the said bolt having threaded engagement with a portion of the bore of the said bushing.

3. In a vehicle rim having a cylindrical rim portion and a pair of side flanges, a cylindrical web integral with each of the said flanges, a plurality of lateral enlargements upon each side flange adjacent to its web, a radial perforation in each of said enlargements, the said perforation extended through the adjacent rim portion and contracted at its end radially outward of the wheel; a bushing slidably fitting but shorter than the uncontracted portion of the said perforation, the bore of the bushing substantially equal to the bore of the said contracted portion of the perforation; and a bolt extending through the said bore of the bushing and the said contracted portion of the perforation; the said bolt having threaded engagement with a portion of the bore of the said bushing; one of the said rims presenting a portion engaging the head of the bolt to prevent rotation thereof.

4. The improvements herein described comprising a vehicle rim consisting of a cylindrical portion and side flanges and adapted to be floatingly carried upon a wheel, means for securing the side flanges to the rim comprising a plurality of bolts extending radially through alined perforations in the side flanges and rim, bushings on the bolts extending through the side flanges and into the rim and serving to dowel the rim and side flanges together, and nuts on the bolts for holding the bushings against removal.

In testimony whereof I have signed my name in presence of two subscribing witnesses.

FRANKLIN A. FROMMANN.

Witnesses:
M. M. BOYLE,
ALBERT SCHEIBLE.

Copies of this patent may be obtained for five cents each, by addressing the "Commissioner of Patents, Washington, D. C."